UNITED STATES PATENT OFFICE.

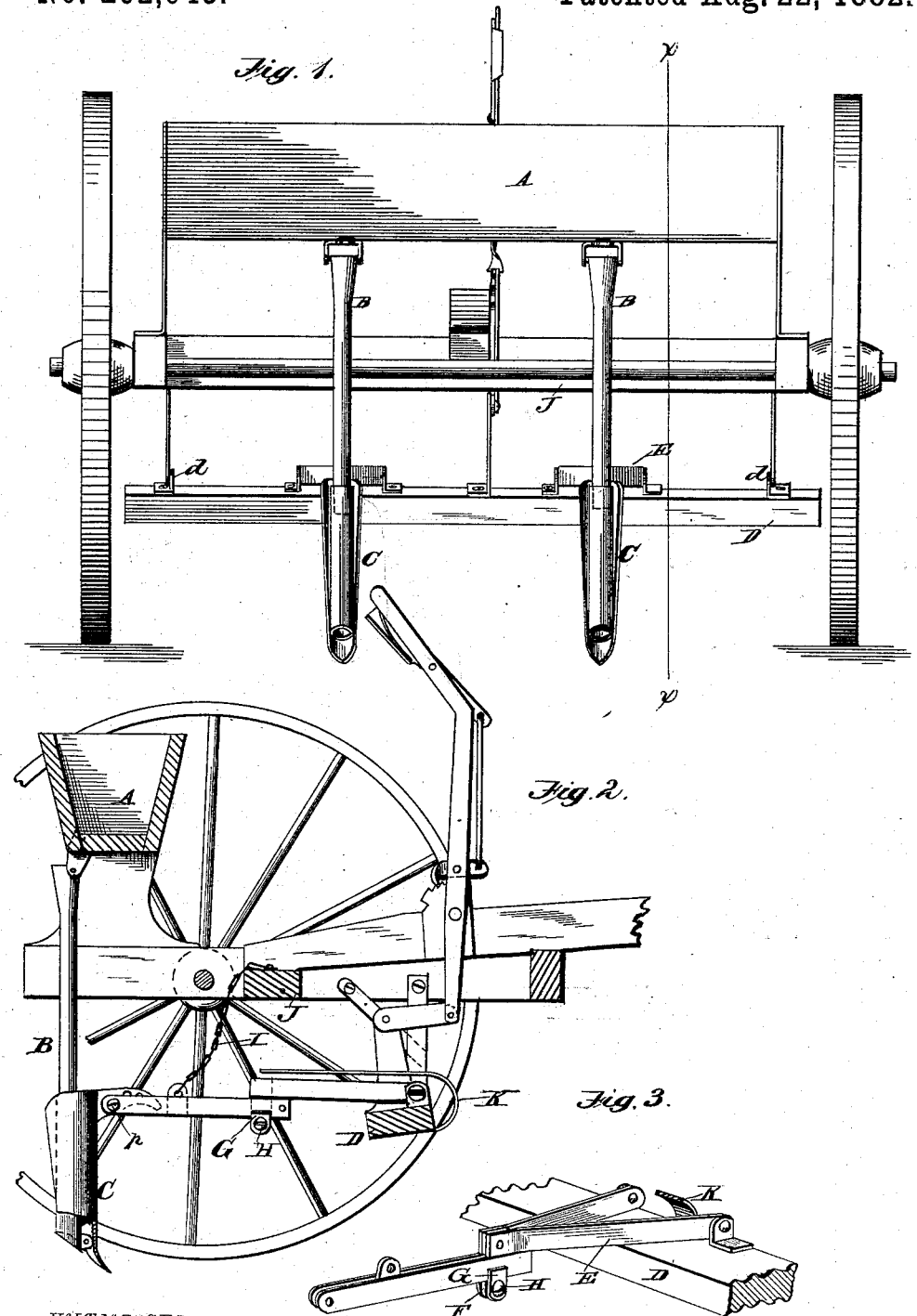

JESSE P. FULGHAM, OF RICHMOND, INDIANA, ASSIGNOR OF ONE-HALF TO THE WAYNE AGRICULTURAL COMPANY, OF SAME PLACE.

GRAIN-DRILL.

SPECIFICATION forming part of Letters Patent No. 262,943, dated August 22, 1882.

Application filed April 14, 1882. (Model.)

*To all whom it may concern:*

Be it known that I, JESSE P. FULGHAM, of Richmond, in the county of Wayne and State of Indiana, have invented certain new and useful Improvements in Grain-Drills; and I do hereby declare the following to be a full, clear, and exact description of the same, reference being had to the accompanying drawings, forming a part of this specification, in which—

Figure 1 is a rear elevation of a grain-drill provided with my improvements. Fig. 2 is a longitudinal vertical section of the same, taken on the line $x\ x$, Fig. 1; and Fig. 3 is a detail view, showing in perspective a portion of the drag-rail and one of the drag-bars and its attachments.

Similar letters of reference in the several figures denote the same parts.

This invention relates to that class of seed-planting machines known as "grain-drills," and has for its object to improve particularly the devices for conducting the grain from the hopper and depositing the same into the ground.

The invention consists, first, in a novel construction whereby I am enabled to use inflexible conducting-tubes for conveying the grain from the discharge-orifices of the hopper to the ground without interfering with the free backward deflection of the hoes or teeth upon striking an immovable obstruction, thereby rendering it feasible to dispense with the unreliable, perishable, and expensive rubber tubes now in general use.

It further consists in hinging the series of drag-bars to a rocking drag-rail and applying a series of pressure-springs to said rail, so that the drag-bars may be left to play freely up and down, or held down by yielding pressure at pleasure.

It further consists in certain other combinations and sub-combinations of parts, which will be hereinafter described and claimed.

In the accompanying drawings, A represents the hopper of the drill; B, the grain-conducting tubes, and C the hoes or teeth, made open at the rear, as shown. The conducting-tubes are each preferably made of two metal sections or tubes, sliding one within the other, the upper or inner sections being slightly flared at their upper ends and hinged to suitable brackets in such proximity to the discharge-openings of the hopper as to receive the grain discharged therefrom, and the lower sections being articulated to the hoes near the lower end of the same, as shown. The making of the tubes in sections enables the lower sections to play freely on the upper sections in raising and lowering the hoes, and thus preserves an unbroken conductor for the grain, while the formation of the hoes with open backs and the articulation of the lower sections of the tubes to their lower ends permits the hoes to be deflected backwardly upon striking an obstruction without injury to the tubes.

D represents the oscillating drag-rail, hinged at $d$ to arms or brackets depending from the main frame of the drill; and E are the rigid drag-bars, hinged to the upper side of the drag-rail, near its front edge, in such a manner as to permit them to freely play up and down to accommodate themselves to the varying positions of the hoes in passing over uneven ground. Each drag-bar is made in two parts or sections, connected together and rendered adjustable on each other, preferably by means of a block, F, securely fastened to the rear portion of the forward section and projecting down into a slot in the rear section, and adapted to be secured at any point of adjustment by clamps G and bolt H. By this construction the bars can be lengthened or shortened, so as to bring all the hoes in a straight line or in a zigzag line, as desired. The upper part of each hoe is pivoted to its drag-bar by a pivot, $p$, and held by a "break-pin" in the usual manner. Chains I, connected at one end to the drag-bars and at the other to the cross-bar J of the drill-frame, limit the downward movement of the drag-bars and prevent the telescopic conductors from being disjointed.

Mounted upon the oscillating drag-rail are a series of springs, K, as many in number as there are drag-bars. One end of each spring is fastened to the rail, and its other end extends out over the adjacent drag-bar, so that when the rear edge of the drag-rail, through the instrumentality of operating-lever L, is depressed, the springs will all come in contact with the upper edges of the drag-bars, and force the hoes into the ground with yielding pressure. The operating-lever is provided with means for locking it at various points of adjustment, as shown.

Having thus described my invention, I claim as new—

1. The combination of the open-back drill-hoe, the hopper of a grain-drill, and the conducting-tube formed of inflexible telescopic sections, the upper one of which is connected to the hopper and the lower one to the open-back drill-hoe, substantially as described.

2. The combination, with the hopper of a grain-drill, of an open-back drill-hoe, the drag-bar to which said hoe is attached, and an inflexible telescopic conducting-tube, substantially as described.

3. The combination, in a grain-drill, of an oscillating drag-rail and an inflexible longitudinally-adjustable drag-bar, substantially as described, for the purpose specified.

4. The combination, with the drag-bar made in two parts, of the block fastened to the rear portion of the forward section of the bar and projecting down into a slot in the rear section, the friction-clamps, and the bolt whereby the clamps are adapted to clamp the rear section of the bar to the block by frictional contact, so as to secure the sections at any point of adjustment, substantially as described.

5. The combination, with the oscillating drag-rail, of the drag-bars connected thereto, the pressure-springs mounted on the drag-rail and projecting over the drag-bars, and means for oscillating the drag-rail, whereby the oscillating of the drag-rail will lower the drag-bars and apply through the springs the requisite pressure on the said drag-bars, substantially as described, for the purpose specified.

JESSE P. FULGHAM.

Witnesses:
WILLIAM BAXTER,
W. W. SCHULTZ.